Feb. 7, 1967  C. F. SCOTT  3,303,296
ATTENUATOR WITH IMPROVED HOUSING STRUCTURE
Filed Dec. 8, 1964

INVENTOR.
CHESTER F. SCOTT
BY
George H. Fritzinger
AGENT

United States Patent Office 3,303,296
Patented Feb. 7, 1967

3,303,296
ATTENUATOR WITH IMPROVED HOUSING STRUCTURE
Chester F. Scott, West Caldwell, N.J., assignor to McGraw-Edison Company, Elgin, Ill.
Filed Dec. 8, 1964, Ser. No. 416,687
5 Claims. (Cl. 200—11)

This invention relates to a novel form of an attenuator.

Objects of the invention are to provide a practical, low-cost attenuator which is of an interlocking construction free of threaded parts to reduce cost of components and assembling time, and which is held into a rigid unitary assembly by a surrounding metal case crimped at the edges.

These and other objects and features of the invention will be apparent from the following description and the appended claims.

In the description of the invention, reference is had to the accompanying drawings, of which:

Figure 1:
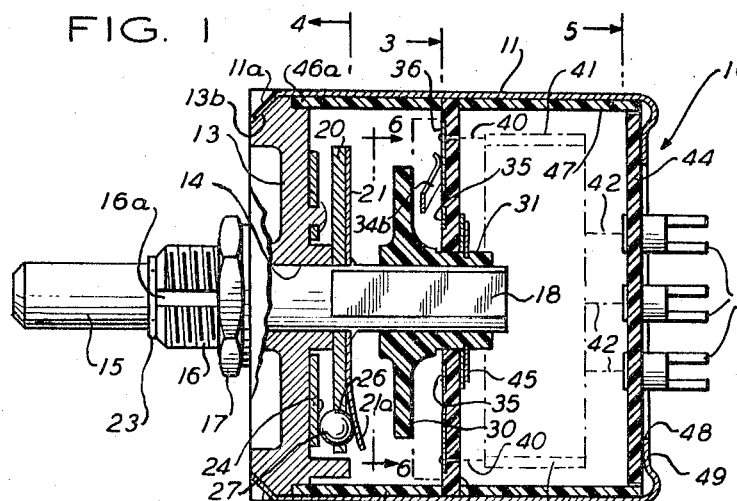
FIGURE 1 is a sectional view of the present attenuator taken through the axis thereof on the line 1—1 of FIGURE 5.
Figure 3:
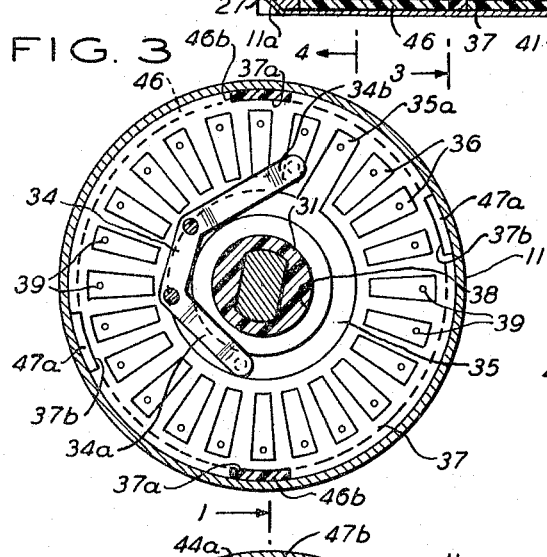
Figure 4:
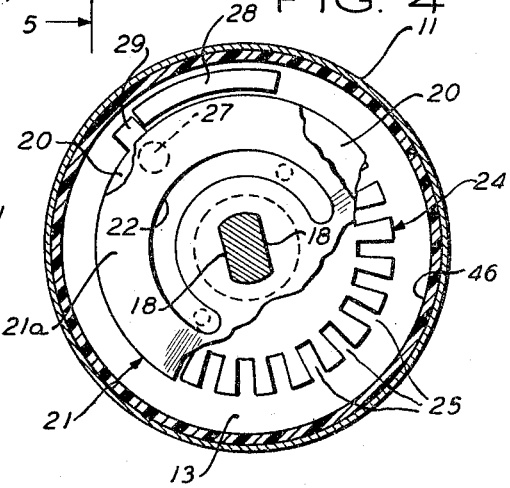
Figure 5:
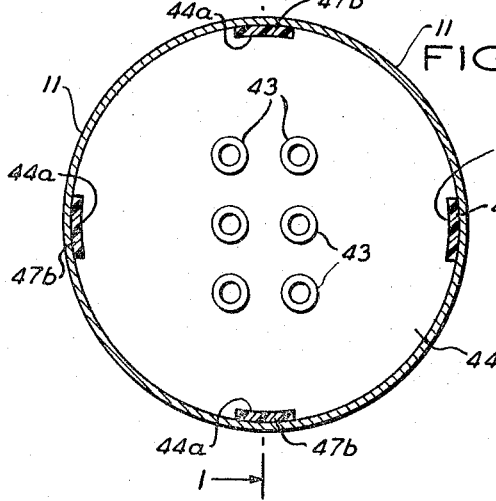
Figure 6:
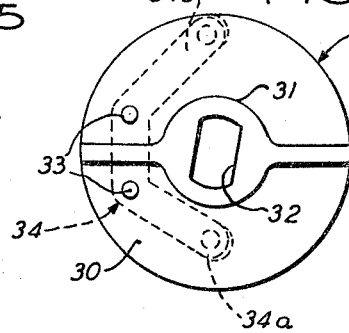

FIGURES 3, 4 and 5 are transverse sectional views taken respectively on the lines 3—3, 4—4 and 5—5 of FIGURE 1; and FIGURE 6 is an end view of the wiper assembly as seen from the line 6—6 of FIGURE 1.

The present attenuator is of a cylindrical construction comprising a plurality of sub-assemblies which fit together into an interlocking relationship and which are held into a unitary construction by a cylindrical metal case 11. The attenuator comprises a circular front panel member 13 of a cast construction having a central bearing 14 receiving a rotary shaft 15. The bearing has a threaded tubular extension 16 provided with a mounting slot 16a and on which is threaded a nut 17 for enabling the attenuator to be secured to a mounting panel (not shown) in the usual way. The inner end portion of the shaft 15 is provided with diametrically opposite flats 18. Splined to this inner end portion of the shaft is a wiper assembly 19 shown in FIGURE 6. Staked to the shaft 15 at the inner end of the flats 18 is a metal disk 20 which is backed at its outer side by a thin circular disk 21 of spring material. The spring disk 21 is provided with an arcuate slot 22 throughout a major portion of its arcuate length so that the arcuate portion 21a subtended by the slot 22 can be flexed readily outwardly. The rotor assembly is held in the front panel member with the disk 18 bearing against the inner end of the bearing 14 by means of a retainer ring 23 engaging a groove in the shaft just beyond the outer end of the bearing. Secured to the inner face of the front panel member 13 is an arcuate detent member 24 provided with a series of peripheral notches 25 as shown in FIGURE 4, and mounted in a hole 26 in the disk 20 between the spring 21a and the notched portion of the detent member 24 is a spherical ball 27. This ball engages the notches 25 in the detent member under the spring pressure to index the rotor shaft at equal intervals. An arcuate lug 28 is formed on the inner face of the front panel member 13 just beyond the disk 20 and on the disk is a radially extending tongue 29 which strikes against this lug to limit the rotary movement of the rotor shaft to a predetermined range less than one full revolution. The apparatus herein so far described constitutes a shaft sub-assembly of the attenuator.

The wiper sub-assembly 19 above-mentioned comprises a rotor disk 30 provided with a cylindrical hub 31 extending from the back side thereof as it is mounted in the attenuator. The hub has a central hole 32 of non-circular form to fit slidably onto the flattened end portion of the rotor shaft 15. Secured by two rivets 33 against the back side of the rotor disk 30 is a somewhat U-shaped spring wiper 34 having one spring arm 34a extending angularly away from the disk in a position to engage a collector ring 35 just beyond the hub 31 and having another spring arm 34b extending angularly away from the disk in a position to engage a series of contacts 36 in a circular arrangement concentric to the collector ring 35.

The collector ring 35 and contacts 36 are part of a printed circuit board forming a disk-shaped contact panel 37 having a central hole 38 forming an external bearing for the hub 31 of the wiper assembly 19 as shown in FIGURES 1 and 3. The collector ring 35 and contacts 36 are inset in the printed board with the collector ring having a radially extending contact lug 35a interposed between two adjacent contacts 36 as shown in FIGURE 3. The contact lug 35a and each of the contacts 36 have holes 39 drilled therethrough to receive the terminal wires 40 of a group of resistors 41 at the back side of the contact panel 37. After each terminal wire is threaded through a hole in the contact panel it is soldered to the respective contact member. The resistor group 41 is connected by suitable lead wires 42 to respective terminal studs 43 of a terminal board 44 also of a disk shape. The contact panel 37 is retained on the hub 31 of the wiper sub-assembly by a retainer ring 45. The contact panel 37 together with the resistor group 41, the wiper assembly 19 and terminal board 44 constitute a rotor sub-assembly of the attenuator.

The contact panel 37 and front panel 13 are held in a spaced aligned relationship by an intervening tubular casing 46 of insulating material. The forward end of this casing 46 has an interlocking engagement with the panel member 13 provided by four rectangular tongues 46a on the casing which engage respective peripheral notches 13a in the panel member 13 open to the back side thereof. Similarly, the rear end of the casing 46 has an interlocking engagement with the contact panel 37 by means of two diametrically opposite rectangular tongues 46b on the casing which engage respective rectangular peripheral notches 37a in the contact panel. When assembled the outer edges of the front panel member 13 and of the contact panel 37 conform to the outer surface of the tubular casing 46 to form a cylindrical structure.

Figure 2:
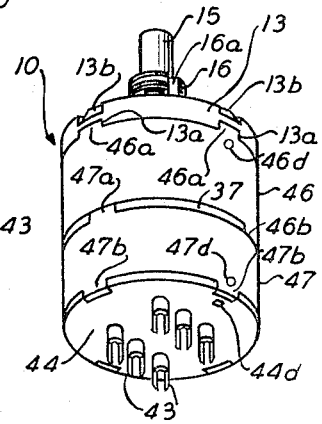
FIGURE 2 is a bottom isometric view of the attenuator.

The printed contact panel 37 and the rear terminal board 44 are held in a spaced aligned relationship by an intervening tubular casing 47 of insulating material. The forward end of this casing has an interlocking engagement with the printed contact panel 37 by means of two diametrically opposite rectangular tongues 47a on the casing which engage respective rectangular peripheral notches 37b in the contact panel. Similarly, the rear end of the casing 47 has an interlocking engagement with the terminal board 44 by means of four equally spaced rectangular tongues 47b on the casing which engage respective rectangular peripheral notches 44a in the terminal board. In order that the contact panel 37 and the terminal board 44 may be assembled in a given rotational relationship with the front panel member 13, the two notches 37b in the contact panel 37 are asymmetrically positioned with respect to the two notches 37a, the tongues 47a at one end of the casing 47 are shifted about the axis of the casing relative to the tongues 47b at the other end thereof, and the casings 46 and 47 and terminal board 44 have respective dot marks 46d, 47d and 44d which are to be aligned with the mountings slot 13a of the front panel member 13 to place the parts in their proper assembled relationship, as shown in FIGURE 2.

From the foregoing description it is seen that the front panel member 13, the contact panel 37 and the casing 46 form a front chamber enclosing the rotor assembly, and that the contact panel 37, the rear terminal board 44 and the casing 47 form a rear chamber enclosing the resistor group 41. The assembly is therefore of a closed construction to prevent dust or other dirt from getting into the attenuator and to interfere with the contact engagement.

The entire assembly above-described is housed in the cylindrical metal case 11. This case is open at one end allowing it to be telescoped onto the assembly from the rear end thereof. When the case is telescoped fully onto the assembly the terminals 43 project through an opening 48 in an end wall 49 of the case, and the open end of the case is approximately flush with the outer face of the front panel member 13. In the front panel member 13 are four peripheral notches 13b with inclined bottom walls which run out the front face of the panel member and into which the overlying edge portions of the case 11a are crimped inwardly against the inclined bottom wall to draw the case tightly onto the assembly to hold it into an integral unit.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. An attenuator of a cylindrical construction comprising an assembly of a front panel member, an intermediate contact panel member and a rear terminal board, intervening tubular casings respectively between said panel members and between said contact panel member and said terminal board, said casings having interlocking groove and tongue engagement with said panel members and terminal board to locate said panel members and terminal board into an aligned relationship, said front panel member having a central bearing, a rotor in the chamber between said two panel members having a shaft journaled in said bearing, said panel member having a series of electrical contacts mounted thereon and said rotor having wiper contacts thereon for selectively engaging said electrical contacts as said rotor is turned, a group of resistors in the chamber between said contact panel member and said terminal board having terminal wires connected to respective contacts of said contact panel, lead wires connecting said resistors to terminals of said terminal board, and a surrounding cylindrical case for holding said assembly into a unitary structure.

2. The attenuator set forth in claim 1 wherein said front panel member and rotor include cooperating stop means to limit rotation of the rotor to a predetermined angular range relative to the front panel member, and wherein said interlocking engagement between said panel members and terminal board with said casings are adapted for locating both said contact panel member and said terminal board in predetermined angular positions with respect to said front panel member.

3. The attenuator set forth in claim 1 wherein said case is of a metal construction, said front panel member is provided with a peripheral groove running out of the front face of the panel member, and the outer edge of said case is crimped inwardly to lock said case to said front panel member and hold said assembly together as an integral unit.

4. The attenuator set forth in claim 3 wherein said front panel member includes a plurality of said grooves spaced at intervals around the panel member and each having an inclined bottom wall leading out the front face of the panel member, and wherein an overlying edge portion of said case is crimped into each of said grooves and onto said inclined bottom wall to draw the case tightly onto said assembly and secure the assembly together as a rigid unitary structure.

5. An attenuator of a cylindrical construction comprising an assembly of a front circular panel member having a central bearing, a rotor having a shaft journaled in said bearing, said rotor including a wiper assembly splined slidably to the inner end portion of said shaft, retainer means locating said shaft lengthwise of said bearing, a contact panel member associated with said wiper assembly, said contact panel member having a central opening forming an external bearing for a hub portion of said wiper assembly, retainer means on said hub portion for locating said wiper assembly in axial directions thereof relative to said contact panel member, said contact panel member having a hole drilled therethrough for each contact member, a plurality of resistors at the back side of said contact panel member having terminal wires extending through said holes and soldered to respective ones of said contacts, a first tubular casing interposed between said front panel member and said contact panel member for locating the contact panel member relative to the front panel member in alignment therewith, a terminal board having terminal studs connected to said resistors, a second tubular casing interposed between said contact panel member and said terminal board, said casings, front and contact panel members and terminal board forming a closed cylindrical structure, and a metal case telescoped onto said cylindrical structure and crimped at one end onto the adjacent end member of said cylindrical structure to hold said assembly together in a tight unitary relationship.

References Cited by the Examiner

UNITED STATES PATENTS

| | | | |
|---|---|---|---|
| 2,484,126 | 10/1949 | Smith | 338—184 X |
| 2,971,174 | 2/1961 | Lyon. | |
| 3,200,208 | 8/1965 | Mastney | 200—14 X |

ROBERT K. SCHAEFER, *Primary Examiner.*

J. R. SCOTT, *Assistant Examiner.*